United States Patent
Keiserman

(10) Patent No.: US 8,002,297 B2
(45) Date of Patent: Aug. 23, 2011

(54) WRAP USED ON THE JOINT OF AN ARM AND AXLE BEAM FOR A PNEUMATIC SUSPENSION SYSTEM

(75) Inventor: Juarez Keiserman, Rio Grande Do Sul (BR)

(73) Assignee: Juarez Keiserman, Rio Grande Do Sul (BR)

( * ) Notice: Subject to any disclaimer, the term of this patent is extended or adjusted under 35 U.S.C. 154(b) by 120 days.

(21) Appl. No.: 12/321,138

(22) Filed: Jan. 15, 2009

(65) Prior Publication Data

US 2009/0194964 A1 Aug. 6, 2009

(30) Foreign Application Priority Data

Jan. 23, 2008 (BR) ...................................... 0800539

(51) Int. Cl.
*B60G 9/00* (2006.01)
(52) U.S. Cl. ........... 280/124.116; 280/124.128; 301/125
(58) Field of Classification Search ............... 280/124.1, 280/124.116, 124.128, 124.157; 295/42; 301/124.1, 125, 137; 403/346, 398, 400
See application file for complete search history.

(56) References Cited

U.S. PATENT DOCUMENTS

| | | | | |
|---|---|---|---|---|
| 420,545 A * | 2/1890 | Peckham | ........................... | 295/35 |
| 822,671 A * | 6/1906 | Keefer et al. | ................. | 105/364 |
| 841,256 A * | 1/1907 | Kelly | .............................. | 295/42 |
| 3,009,747 A * | 11/1961 | Pitzer | ............................. | 384/272 |
| 3,542,393 A * | 11/1970 | Verdi | ............................. | 280/683 |
| 3,707,298 A * | 12/1972 | Henry et al. | ........... | 280/124.116 |
| 4,615,539 A * | 10/1986 | Pierce | .................... | 280/124.116 |
| 4,693,486 A * | 9/1987 | Pierce et al. | .................. | 280/80.1 |
| 5,112,078 A * | 5/1992 | Galazin et al. | ......... | 280/124.116 |
| 5,116,075 A * | 5/1992 | Pierce | .................... | 280/124.116 |
| 5,413,374 A * | 5/1995 | Pierce | .................... | 280/124.177 |
| 5,669,728 A * | 9/1997 | Koba | ............................. | 403/270 |
| 6,032,967 A * | 3/2000 | Ogoniek | ................. | 280/124.175 |
| 6,123,349 A * | 9/2000 | Depue | .................... | 280/124.106 |
| 6,508,482 B2 * | 1/2003 | Pierce et al. | ........... | 280/124.116 |
| 6,805,369 B2 * | 10/2004 | Galazin | .................. | 280/124.116 |
| 6,827,360 B2 * | 12/2004 | Chan et al. | ............. | 280/124.116 |
| 7,007,960 B2 * | 3/2006 | Chalin et al. | ........... | 280/124.116 |
| 7,048,288 B2 * | 5/2006 | Chan et al. | ............. | 280/124.116 |
| 7,086,655 B2 * | 8/2006 | Chan et al. | ............. | 280/124.116 |
| 7,267,348 B1 * | 9/2007 | Klein et al. | ............. | 280/124.128 |
| 7,328,908 B2 * | 2/2008 | Barber et al. | ............. | 280/93.512 |
| 7,347,435 B2 * | 3/2008 | Chalin | .................... | 280/124.116 |
| 7,360,774 B2 * | 4/2008 | Saieg et al. | ............. | 280/124.128 |
| 7,377,530 B2 * | 5/2008 | Ziech et al. | .............. | 280/124.11 |
| 7,628,457 B2 * | 12/2009 | Pochatila et al. | ............. | 301/132 |
| 7,731,211 B2 * | 6/2010 | Ramsey | ................. | 280/124.131 |
| 7,740,255 B2 * | 6/2010 | Holt | ........................ | 280/124.128 |
| 2006/0113741 A1 * | 6/2006 | Chalin | .................... | 280/124.116 |
| 2007/0246286 A1 * | 10/2007 | Henze | .......................... | 180/349 |
| 2009/0058029 A1 * | 3/2009 | Drewes | ....................... | 280/124.1 |
| 2009/0072505 A1 * | 3/2009 | McGinnis | .............. | 280/124.116 |

* cited by examiner

*Primary Examiner* — Toan C To
*Assistant Examiner* — Laura Freedman
(74) *Attorney, Agent, or Firm* — Steven L. Nichols; VanCott, Bagley, Cornwall & McCarthy P.C.

(57) ABSTRACT

A wrap used on pneumatic suspension systems which includes a cylindrical body (100) with a single aperture for links (110) which extends along the surface of the cylindrical body (100), the aperture (110) having a region of interruption (101) with the single aperture form (110), and also including a sequence of concordant slots (120).

5 Claims, 4 Drawing Sheets

WRAP USED ON THE JOINT OF AN ARM AND AXLE BEAM FOR A PNEUMATIC SUSPENSION SYSTEM

This application claims priority from Brazilian Application No. PI 0800539-7 filed Jan. 23, 2008. Application PI 0800539-7 is hereby incorporated by reference.

BACKGROUND

1. Field of the Invention

The invention presented here is for a wrap used on a joint of an arm and axle beam for a pneumatic suspension system. More specifically it consists of a wrap with a single aperture, reducing the concentration of stress acting on the joint region between the axle beam and the arm of the pneumatic suspension system.

2. Description of the Prior Art

Air-link type pneumatic suspension systems which use parabolic springs as a link component between the axle and the front supports are characterized by the heavy weight and cost due to the use of the parabolic springs. An alternative to using parabolic springs in air-link type pneumatic suspension systems is to use an arm made of steel plates to link the axle to the suspension supports which gives lighter and more economically competitive suspension systems. On the other hand, suspension systems of this type have the operational characteristics of mechanically affecting the joint region between the axle beam and the arm, causing a high level of stress. In order to reduce the stress levels found in the joint region between the axle beam and the arm of that pneumatic suspension system, a part, called a wrap, is many times used as an interface placed between the axle beam and the suspension arm. The prior art concept presents a wrap with two apertures where the axle beam is fastened by welding at the apertures. The apertures have different shapes for the purpose of minimizing the stress levels acting in the joint region between the axle beam and the arm of the pneumatic suspension system. However, in more rigorous applications, which occur on poorly maintained highways, the stress on the weld of the current solutions can result in cracks and consequently the axle breaking.

SUMMARY OF THE INVENTION

In general, the present invention is for a wrap used on a joint of an arm and an axle beam in pneumatic suspension systems which consists of a cylindrical body with a single aperture for links with the axle beam. This single aperture extends along the surface of the cylindrical body. It is a characteristic of the present invention of a wrap used on a joint of an arm and axle beam in pneumatic suspension systems that it has a single aperture which, due to the reduction in the concentration of stresses in the axle, gives a longer life to the axle beam before fatigue sets in. It is also a characteristic of the present invention of a wrap with single aperture that it eliminates corners in high stress regions of the axle, reducing the concentration of stress.

Several drawings and illustrations have been presented to aid in understanding the present invention. The scope of the present invention is not limited to what is shown in the figures.

DETAILED DESCRIPTION OF THE INVENTION

Figure 1:
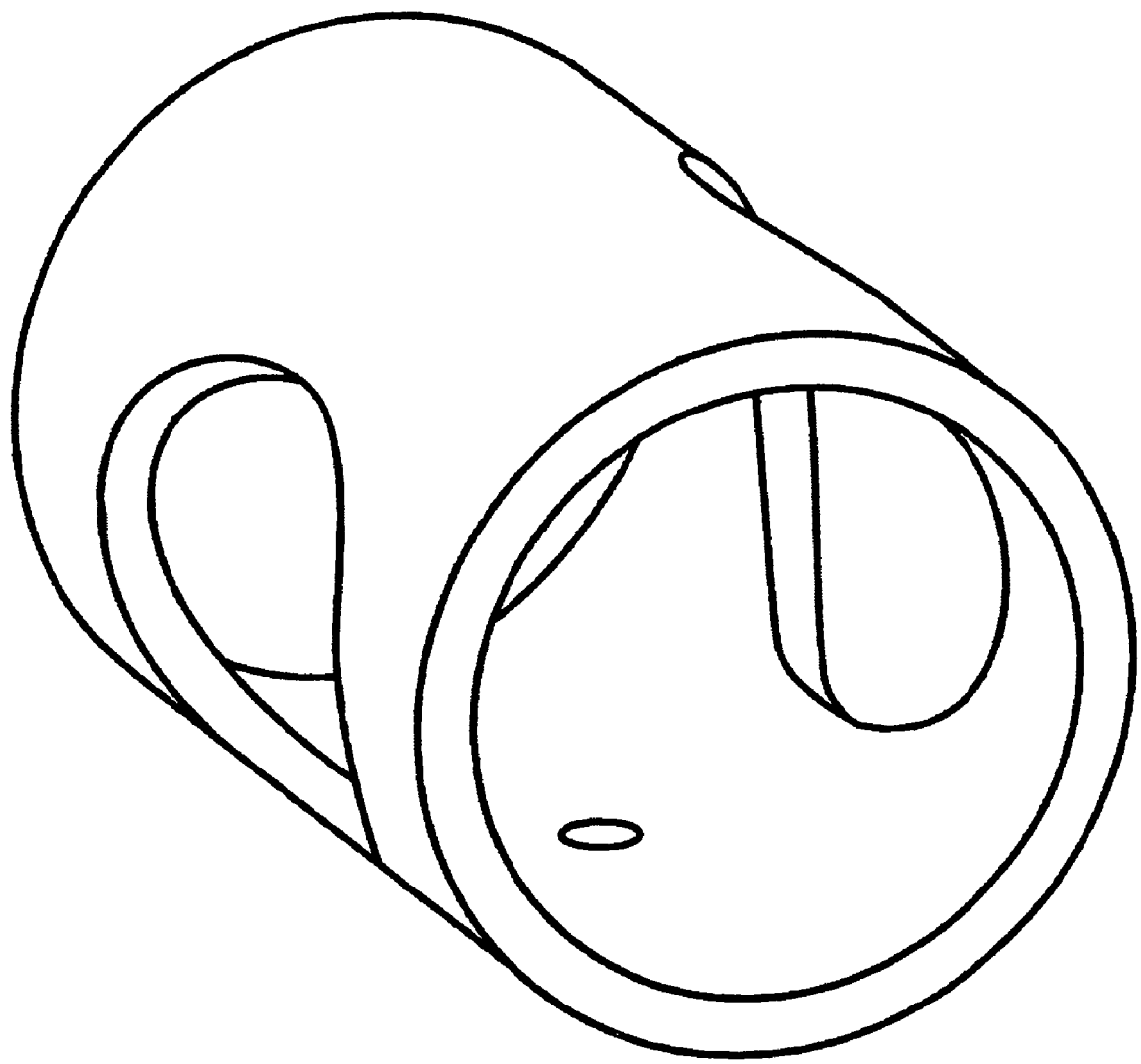
FIG. 1, shows a perspective view of the prior art concept wrap, showing two apertures.
Figure 2:
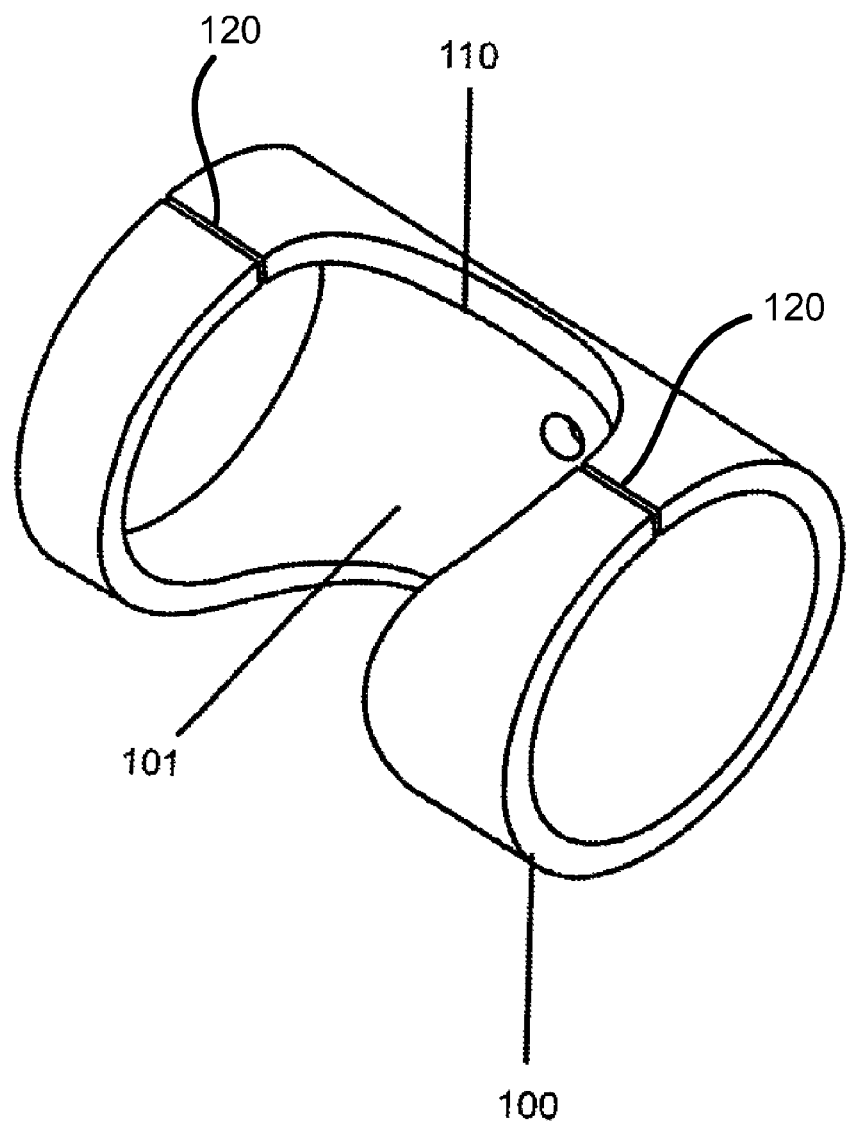
FIG. 2, shows a perspective view of a wrap with a single aperture.
Figure 3:
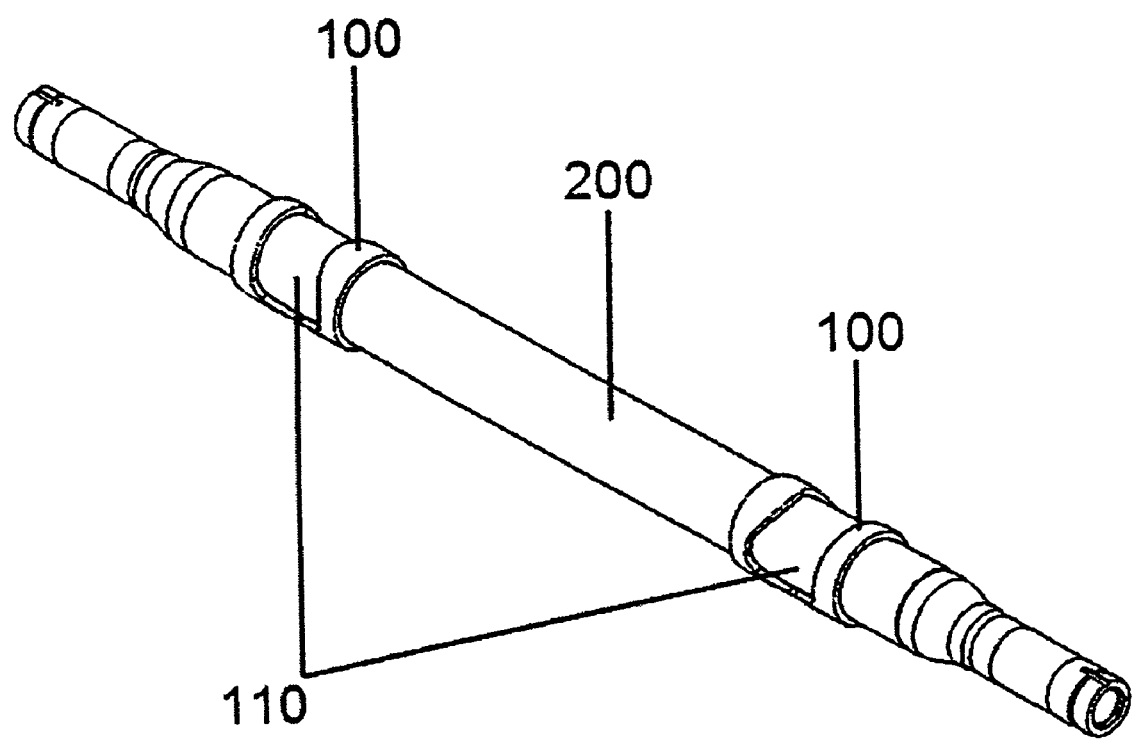
FIG. 3, shows details of the axle beam and wrap mounting.
Figure 4:
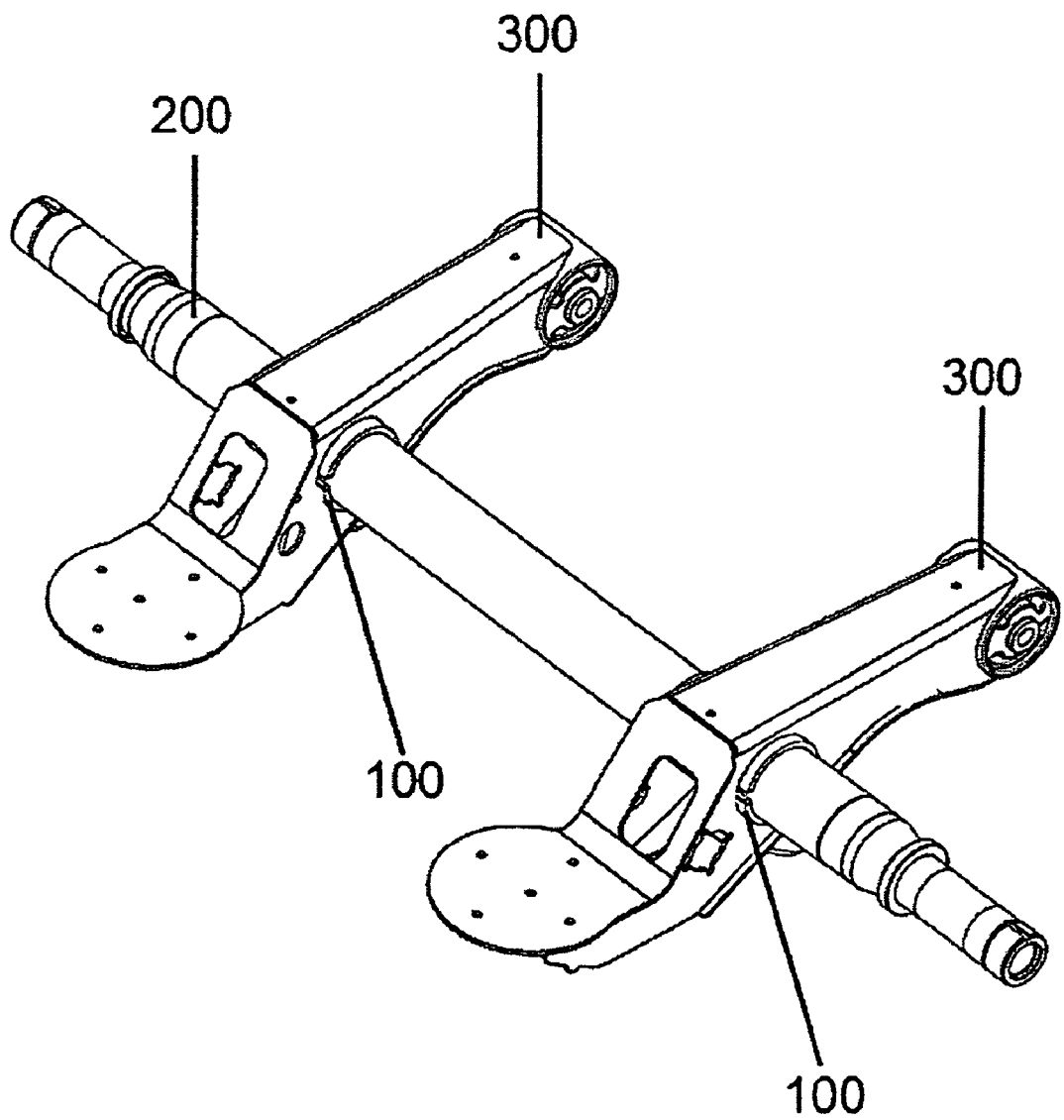
FIG. 4, shows a representation of the arm and axle beam group.

FIG. 1 shows a prior art wrap with two apertures. FIG. 2 shows an embodiment of the present invention with one aperture. FIG. 3 shows an axle beam with a wrap mounting using an embodiment of the present invention. FIG. 4 shows an arm and axle beam group.

The wrap used on a joint of an arm and axle beam in pneumatic suspension systems, the object of this present invention, includes a cylindrical body (100) with a single aperture for links (110) with the axle beam (200). The single aperture (110) extends along the surface of the cylindrical body (100), the single aperture (110) presenting a region of interruption (101). The single aperture (110) includes a sequence of concordant slots (120). These slots [120] generally penetrate through the curved outer surface of the cylindrical body (100) running from the end of the cylinder into the aperture (110). Generally there are two of these slots (120), one near each end of the cylindrical body (100). These slots allow the body to expand if necessary.

Computerized structural tests using the finite element method showed that wraps with a single aperture show significant advantages when compared to wraps with two apertures described in the prior art concept. The wraps with a single aperture have less stress concentrated on the axle and in the region of the joint between the axle beam (200) and the pneumatic suspension arm (300). The reduction in concentration of stress should be the main design consideration in the geometric development of the aperture: eliminating corners, making better welding possible, and reducing the concentration of stress. When the wrap with a single aperture is used it increases the life of the axle when welded in the region where the concentrated stress is found detrimental to the component.

I claim:

1. A wrap used on joint arms and axle beams for pneumatic suspension systems comprising:
    a cylindrical body (100) comprises a tube with open ends, a curved cylindrical surface and a single aperture (110) which extends along said curved cylindrical surface of the cylindrical body (100), said aperture (110) giving a region of interruption (101) and expansion slots (120) penetrating through the surface of the cylindrical body (100), in which a first expansion slot runs between a first open end of the cylindrical body and the aperture (110) and a second expansion slot runs between a second open end of the cylindrical body and the aperture (110), the expansion slots (120) being configured to allow the diameter of said cylindrical body to expand.

2. The wrap of claim 1, in which said expansion slots are located on said cylindrical body circumferentially at points of least distance between the ends of said body and said aperture.

3. The wrap of claim 1, in which the cylindrical body is formed from a single curved piece of material.

4. A wrap for axle beams and joint arms comprising, in combination:
    a generally tubular cylindrical body having flat ends and a curved outer cylindrical surface;
    a single aperture in the curved outer surface of said cylindrical body between said ends extending longitudinally along the curved surface for more than ½ a length of the curved surface, said aperture also extending along the circumference of said curved surface over an angular distance of more than 180 degrees;

a pair of longitudinal slots in the outer surface of the cylindrical body, said slots extending from the ends of said tubular cylindrical body to said aperture.

5. The wrap of claim 4 wherein said slots are located on said cylindrical body circumferentially at points of least distance between the ends of said body and said aperture.

* * * * *